United States Patent
Yamamoto et al.

(10) Patent No.: US 10,083,602 B2
(45) Date of Patent: Sep. 25, 2018

(54) SAFETY DEVICE AND TOOL

(71) Applicant: MAX CO., LTD., Chuo-ku, Tokyo (JP)

(72) Inventors: Yuu Yamamoto, Tokyo (JP); Yasunori Takahashi, Tokyo (JP); Shuhei Kurita, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 15/292,341

(22) Filed: Oct. 13, 2016

(65) Prior Publication Data

US 2017/0110006 A1 Apr. 20, 2017

(30) Foreign Application Priority Data

Oct. 16, 2015 (JP) .................................. 2015-205056

(51) Int. Cl.
*G08C 17/02* (2006.01)
*B25F 5/00* (2006.01)
*F16P 3/00* (2006.01)
*G08C 23/02* (2006.01)

(52) U.S. Cl.
CPC ................ *G08C 17/02* (2013.01); *B25F 5/00* (2013.01); *F16P 3/00* (2013.01); *G08C 23/02* (2013.01); *G08C 2201/91* (2013.01)

(58) Field of Classification Search
CPC ........ G08C 17/02; G08C 2201/91; B25F 5/00
See application file for complete search history.

(56) References Cited

U.S. PATENT DOCUMENTS

| 5,666,010 A * | 9/1997 | Stratiotis | F16P 1/00 307/326 |
| 2004/0108120 A1* | 6/2004 | Wiesner | B25F 5/00 173/2 |
| 2004/0200329 A1* | 10/2004 | Sako | B23D 59/001 83/58 |
| 2005/0110638 A1* | 5/2005 | Mohr | G06Q 10/087 340/572.1 |
| 2006/0000332 A1* | 1/2006 | Sako | B23D 59/001 83/477.2 |

(Continued)

FOREIGN PATENT DOCUMENTS

| EP | A1-2679326 | 1/2014 |
| JP | 4678199 B2 | 4/2011 |

(Continued)

OTHER PUBLICATIONS

Extended European Search Report dated Apr. 6, 2017 in corresponding European patent application 16002216.6 (8 pages).

*Primary Examiner* — Thomas Alunkal
(74) *Attorney, Agent, or Firm* — Drinker Biddle & Reath LLP (57) ABSTRACT

A safety device includes: a tool which performs a predetermined operation through an operation of an actuator; a mounting tool worn by a user operating the tool; a transmission unit which is provided in one of the tool or the mounting tool, and transmits a wireless signal in which a transmission direction is set to have high directional characteristic with respect to a certain direction; a reception unit which is provided in the other of the tool or the mounting tool, and receives the wireless signal transmitted by the transmission unit; and a controller which controls the tool on a condition that the reception unit recognizes the wireless signal.

17 Claims, 9 Drawing Sheets

(56) References Cited

U.S. PATENT DOCUMENTS

| | | | |
|---|---|---|---|
| 2006/0179473 A1* | 8/2006 | Innami | B25F 5/00 726/2 |
| 2008/0122302 A1* | 5/2008 | Leininger | H02K 7/1823 310/50 |
| 2010/0289662 A1* | 11/2010 | Dasilva | F16P 3/147 340/686.6 |
| 2012/0111589 A1* | 5/2012 | Schmidt | B25F 5/00 173/1 |
| 2013/0137468 A1* | 5/2013 | Kahle | G01C 15/00 455/457 |
| 2014/0168266 A1* | 6/2014 | Kimura | G02B 27/0172 345/633 |
| 2014/0240125 A1 | 8/2014 | Burch et al. | |
| 2015/0135306 A1 | 5/2015 | Winkler et al. | |
| 2017/0008159 A1 | 1/2017 | Boeck et al. | |

FOREIGN PATENT DOCUMENTS

| | | |
|---|---|---|
| JP | 2014-120786 A | 6/2014 |
| JP | 4429616 B2 | 7/2014 |
| JP | 5537106 B2 | 7/2014 |
| WO | WO-A1-2015110245 | 7/1995 |

\* cited by examiner

SAFETY DEVICE AND TOOL

CROSS-REFERENCE TO RELATED APPLICATION

This application claims priority from Japanese Patent Application No. 2015-205056 filed on Oct. 16, 2015, the entire contents of which are incorporated herein by reference.

FIELD

The present disclosure relates to a safety device and a tool.

BACKGROUND

In the related art, there have been known various inventions which control an operation of an electric tool and the like. For example, there is a configuration that a wireless communication is possible between the electric tool and a management device, and when both devices are separated to have a distance exceeding a certain value, the wireless communication becomes impossible, and a motor of the electric tool is switched into a rotation inhibition mode (Japanese Patent No. 5537106). In the relevant invention, when the electric tool is stolen by a third person to be moved to a place separated from the management device, the tool can become in an unserviceable state. Therefore, it is possible to prevent stealing.

There has been known a configuration that in an electric tool having a high stealing suppression effect, a person not wearing a proper authentication device cannot use the tool (Japanese Patent No. 4678199). Specifically, the electric tool includes an authentication circuit, and the authentication circuit performs an authentication using an identification code between the authentication circuit and the authentication device (wrist watch and the like) mounted on the wrist of the user. On the base of the authentication result, a permission is given with respect to the operation of the electric tool. In transmitting and receiving the identification code, the body of the user may be used as a transmission path, or RFID which is a short-range wireless communication may be used to transmit and receive a signal.

There has been known a configuration that in an invention using a table saw as an embodiment, it is intended that a contact of a human body with a rotating saw blade is prevented in advance (Japanese Patent No. 4429616). In the relevant invention, for example, the distance from a detection device to an object and the speed of the object approaching the detection device side (circular saw side) are detected by using a Doppler radar and the like, a case where the object approaches at a speed exceeding the speed presumed as an normal work operation is determined as an abnormal situation, and the circular saw is stopped before the object contacts the circular saw.

There is described an invention in which when the user has a head mounted display mounted thereon, and views the vicinity of the table saw, a camera of the head mounted display obtains an outside image, and the table saw is recognized to call attention to the user (JP 2014-120786 A).

As described above, for various purposes such as the stealing prevention and the danger avoidance, the operation of the tool is controlled based on the positional relation, the behavior, and the like, between the tool and the user.

The tool having electricity, air pressure, and other various kinds of power as an operation source generally has high output, and thus an erroneous use method causes a danger, and it is necessary to be cautious about handling. Since these are understood well by the user, a usual user performs the operation very carefully in the use of the tool. The careful operation is generally based on the premise that the user views the work area or the tool.

Various types of tools such as a nail driving machine, a circular saw, and an electric drill are used in various construction sites and work environments. In a case where such tools are operated with a use purpose, the work is carefully performed while the user has a care about an accident as described above. However, during a work, the user may perform another work at the same time with his eyes turned away from the tool. At this time, for example, the tool held by a hand is crushed into a wall to erroneously perform the operation, and thus the object is broken. When the tool is tangled in clothes, the operation may be performed erroneously, and the user may be hurt.

SUMMARY

The present disclosure has been made in consideration of the above situation, and an object thereof is to suppress an operation of a tool when a user is not conscious of the tool being used, so that an occurrence of an accident or an injury is prevented in advance.

The safety device of the present disclosure may have the following configuration.

The safety device includes: a tool which performs a predetermined operation through an operation of an actuator; a mounting tool worn by a user operating the tool; a transmission unit which is provided in one of the tool or the mounting tool, and transmits a wireless signal in which a transmission direction is set to have high directional characteristic with respect to a certain direction; a reception unit which is provided in the other of the tool or the mounting tool, and receives the wireless signal transmitted by the transmission unit; and a controller which controls the tool on a condition that the reception unit recognizes the wireless signal.

The safety device of the present disclosure may have the following configuration.

The safety device includes: a tool which performs a predetermined operation through an operation of an actuator; a mounting tool worn by a user operating the tool; a reception unit which is provided in one of the tool or the mounting tool, and receives a wireless signal in which a receiving direction is set to have high directional characteristic with respect to a certain direction; a transmission unit which is provided in the other of the tool or the mounting tool, and transmits the wireless signal which is receivable by the reception unit; and a controller which controls the tool on a condition that the reception unit recognizes the wireless signal.

The safety device of the present disclosure may have the following configuration.

The safety device includes: a tool which performs a predetermined operation through an operation of an actuator; a mounting tool worn by a user operating the tool; and a controller which controls the tool on a condition that it is detected that the tool and the mounting tool are opposed to each other within a certain range.

The safety device of the present disclosure may have the following configuration.

The safety device includes: a tool which performs a predetermined operation through an operation of an actuator; an imaging unit provided in the tool; and a controller which controls the tool based on information obtained by the imaging unit.

The tool of the present disclosure may have the following configuration.

The tool performs a predetermined operation through an operation of an actuator and includes: a communication unit which performs communication with a mounting tool worn by a user operating the tool through a wireless signal; a controller which is capable of executing an operation different from the predetermined operation on a condition that the wireless signal is recognized between the tool and the mounting tool, or it is detected that the tool and the counting tool are opposed to each other within a certain range.

The tool using power is useful as a device having high workability, while there is a danger that the operation is performed in the state unintended by the user. For example, there is a case where while the tool is operated in a narrow workplace, the tool contacts an object which is not an original object to drive a nail erroneously. In the middle of moving while holding the tool with a hand, a force is applied from an external side, for example, the tool is pulled by an air hose as an operation source, which may cause a nail to be driven to an unintended object. An aspect of such an erroneous operation occurs when the user is not conscious of the operation of the tool.

In the present disclosure, the tool is operated (the operation inhibition state of the tool is released) with a state where the user views the tool, or it is assumed that the user views the tool set as an operation condition of the tool. Therefore, it is possible to prevent the above-described erroneous operation.

DETAILED DESCRIPTION

Hereinafter, the description will be given about an embodiment of the present disclosure.

Figure 1:
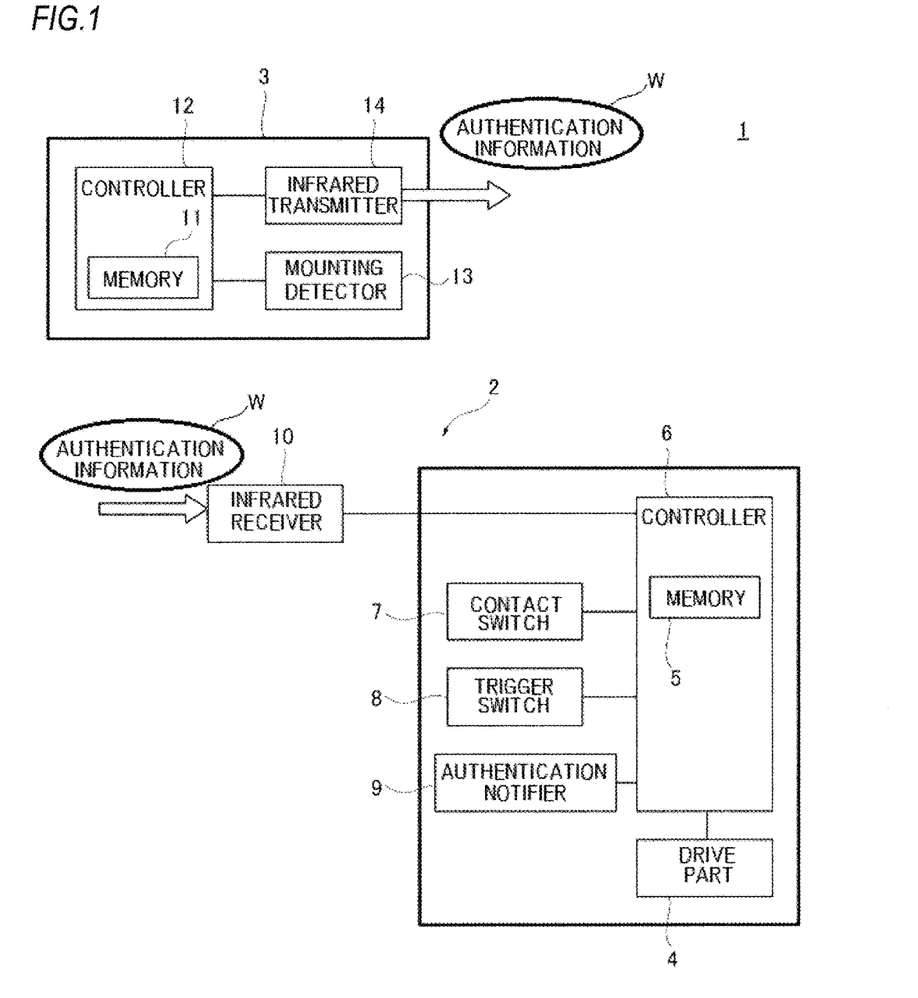
FIG. 1 is a block diagram illustrating an outline of a safety device according to this embodiment.

FIG. 1 is a block diagram illustrating an outline of a safety device 1 according to the present disclosure. The safety device 1 includes a tool 2 and a mounting tool 3 provided as a separate body from the tool 2. The tool 2 performs a predetermined operation by a drive part 4 including an actuator operated by air pressure, electricity, and another power source.

FIG. 1 illustrates an example in which the tool 2 is configured as a nail driving machine. The nail driving machine includes the drive part 4 having a plunger operated by an electric motor and a compression spring. The drive part 4 performs driving through the operation of a motor or the control of releasing a spring force.

The tool 2 includes a controller 6 executing a program stored in a memory 5, and the controller 6 is configured to be electrically connected with the drive part 4, a contact switch 7, a trigger switch 8, an authentication notifier 9, and an infrared receiver 10.

The tool 2 according to this embodiment is configured as a nail driving machine which can be operated with one hand, and is configured to drive a nail into a predetermined position. One operation condition of the tool 2 is a state where the injection portion of the nail is pushed to a driving target object, and the tool 2 includes a contact arm for detecting the pushed state. The contact arm is a general safety mechanism used in the nail driving machine, and is configured to be retreated to a main body side by pushing the driving target object. The contact switch 7 is a switch which detects the retreat of the contact arm, and is provided in order that the controller 6 determines whether the contact arm is retreated.

The trigger switch 8 is a switch which is opened and closed in conjunction with a trigger lever operated when injecting a nail, and is provided in order that the controller 6 detects the operation of the trigger lever. The authentication notifier 9 displays a result of an authentication process performed by the communication between the tool 2 and the mounting tool 3 by the control of the controller 6. The authentication notifier 9 includes a light emitting element such as LED, a piezoelectric element generating a notification sound, and another notification unit.

The controller 6 is connected with the infrared receiver 10 as a reception unit which receives an infrared signal as a kind of wireless signal. A light receiving element of infrared rays included by the infrared receiver 10 is provided in the center of a head portion 17 of a housing disposed on the opposite side of the injection part of the nail. The light receiving element is disposed to received the infrared signal incident on the substantially hemispherical area which is centered on the head portion 17 of the housing.

The controller 6 is a control unit which performs the authentication process or the determination process on whether the infrared signal received through the infrared receiver 10 is a signal transmitted by the mounting tool 3, and permits or limits the driving of the drive part 4 based on these conditions.

Figure 2A:
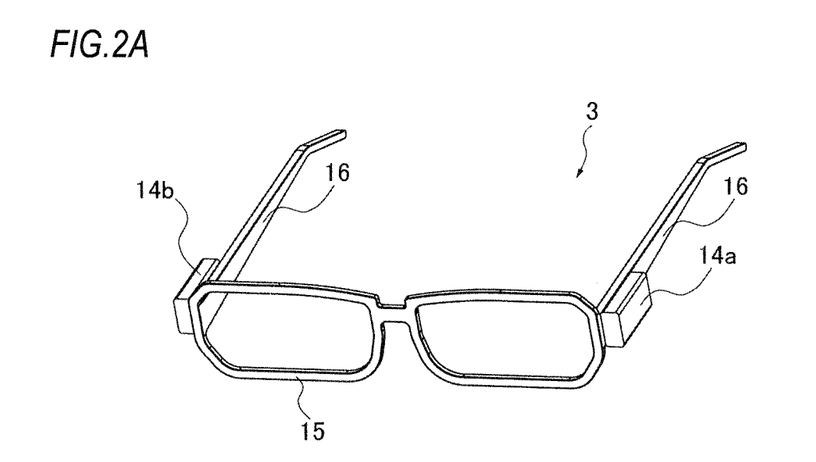
FIG. 2A is a front perspective view illustrating an example of a mounting tool used in this embodiment.
Figure 2B:
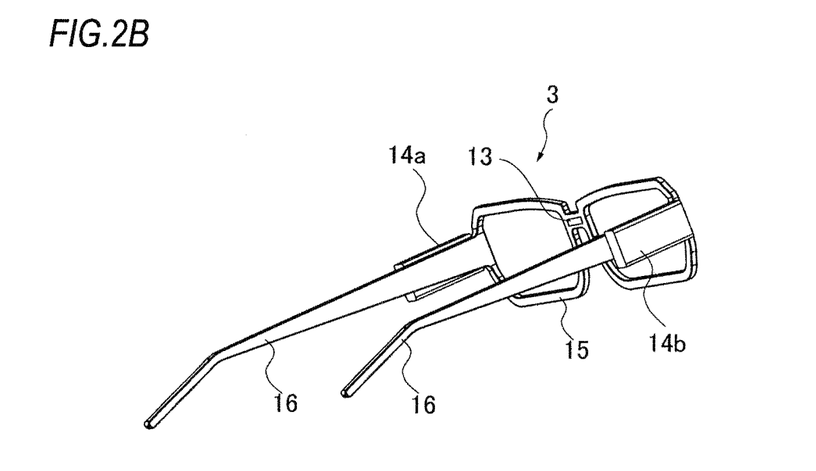
FIG. 2B is a side perspective view illustrating the example of the mounting tool used in this embodiment.
Figure 2C:
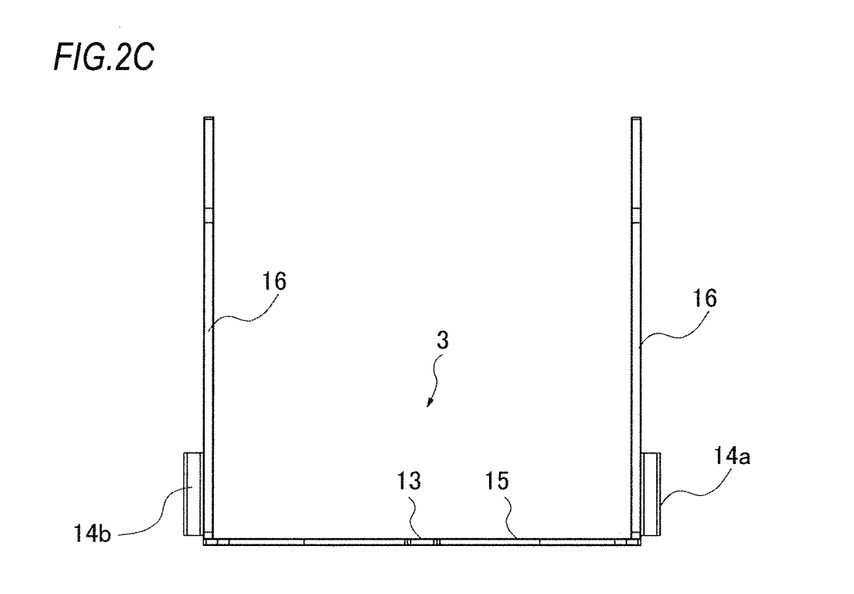
FIG. 2C is a plan view illustrating the example of the mounting tool used in this embodiment.
Figure 2D:
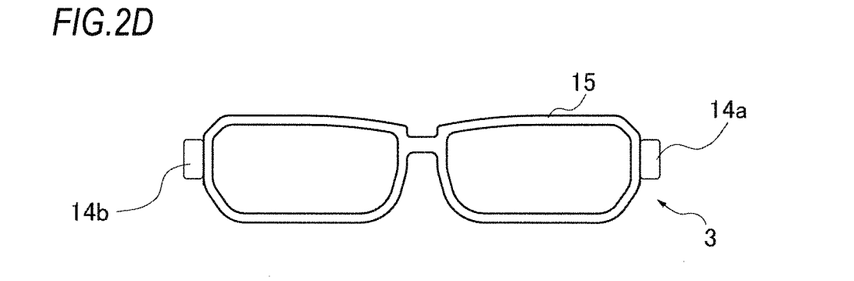
FIG. 2D is a front view illustrating the example of the mounting tool used in this embodiment.
Figure 2E:
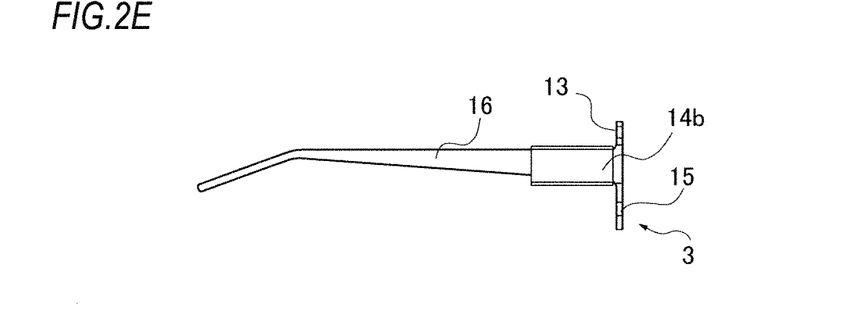
FIG. 2E is a side view illustrating the example of the mounting tool used in this embodiment.

The mounting tool 3 is formed in a shape of eyeglasses (including goggles) as illustrated in FIGS. 2A to 2E, for example. FIG. 2A is a front perspective view of the mounting tool 3 used in this embodiment. FIG. 2B is a side perspective view of the mounting tool 3. FIG. 2C is a plan view of the mounting tool 3. FIG. 2D is a front view of the mounting tool 3. FIG. 2E is a side view of the mounting tool 3. The mounting tool 3 is provided with a controller 12 including a memory 11, a mounting detector 13, and an infrared transmitter 14. The program executed by the controller 12 included in the controller of the mounting tool 3 and unique identification information set in the mounting tool 3 (authentication information W used for pairing with the tool 2) are stored in the memory 11.

The mounting tool 3 formed in a shape of eyeglasses includes a lens frame 15 having lens mounted thereon, and temples 16 attached on the right and left sides of the lens frame 15. The infrared transmitter 14 as a transmission unit of the infrared rays which is one kind of the wireless signal is provided in the tip of the temple 16 to which the lens frame 15 is joined. In a case where the mounting tool 3 is mounted on the face of a user, the infrared transmitter 14 is disposed to transmit the infrared signal forward from the face of a wearer. In this embodiment, the infrared transmitter 14 (14a and 14b) is provided in each tip of the right and left temples 16 and 16.

For example, when the light emitting element (LED and the like) forming the infrared transmitter 14 is contained in a hole or a duct having an opening provided in the end portion, the infrared radiation range is limited (adjusted) so that the infrared rays can be radiated in a range narrower than the directional characteristic of the light emitting element. That is, by setting an angle (range) of radiating the infrared ray to be narrow, a transmitting direction can be set such that the device has a high directional characteristic. In the above-described device which receives the infrared lays, a receiving direction may be set to have a high directional characteristic in such a manner that the light receiving element and the like is contained in a hole or a duct having an opening provided in the end portion, and the infrared reception range is set to be narrow. The case can produce the same effect as a case of limiting (adjusting) the infrared radiation range.

The mounting detector 13 which detects whether the mounting tool 3 is mounted on the face is provided in the center of the lens frame 15. As the mounting detector 13, a non-contact sensor using reflection of the infrared rays is used, and is configured to detect the closeness to the face and determine whether the mounting tool 3 is present. Instead of the non-contact sensor, a conduction sensor which detects the contact with skin may be used, and the type or the arrangement position of the mounting detector 13 is not limited to the example.

Figure 3:
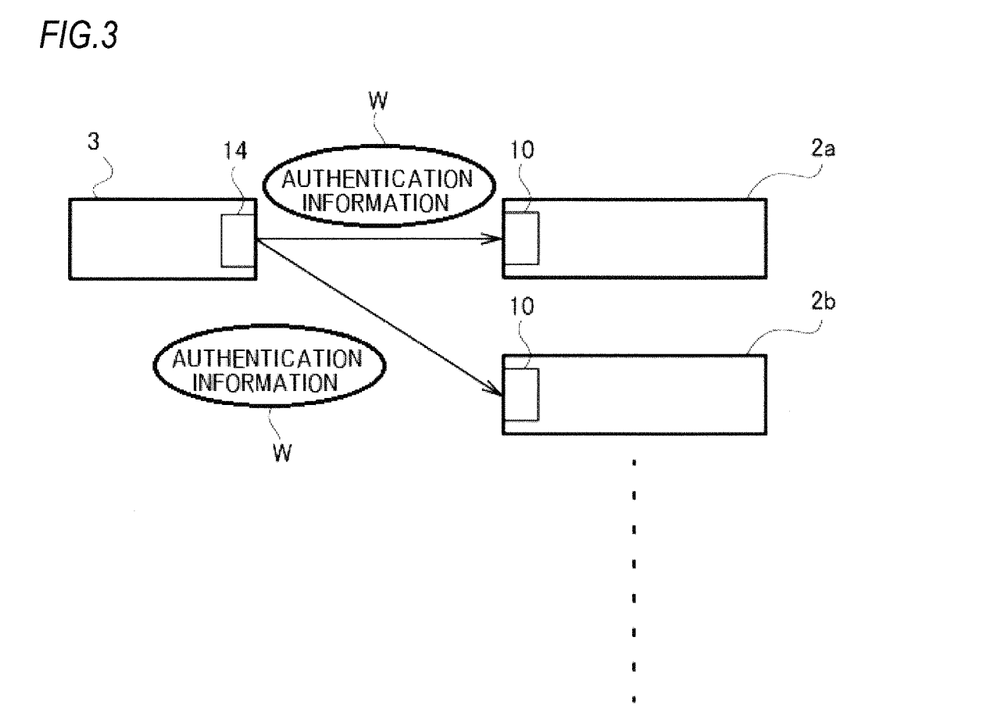
FIG. 3 is an explanatory diagram illustrating a correspondence relation between the mounting tool and a tool according to this embodiment.

The tool 2 and the mounting tool 3 are configured such that the pairing is performed between both devices. FIG. 3 is an explanatory diagram illustrating an embodiment of the pairing.

FIG. 3 illustrates an example in which the pairing is performed between one mounting tool 3 and two or more tools 2 (2a, 2b . . . ). The pairing is a process of registering the authentication information of the mounting tool 3 (unique identification information stored in the memory 11) in the tool 2 (or, as another example, a process of registering the unique identification information of the tool in the mounting tool).

The tool 2 according to this embodiment is configured to perform the operation of each tool such as an operation of driving a nail only in the case of receiving a signal from the mounting tool 3 paired in advance. Therefore, even in a case where a signal from the mounting tool is received, but the signal is sent by a mounting tool not paired, the operation of driving a nail and the like is not performed.

When a plurality of mounting tools are configured to be paired with respect to one tool as described above, a plurality of workers can share one tool. In a case where the plurality of mounting tools are paired with one tool in advance as above, the mounting tool which permits an operation based on the communication with the tool may be configured to be selected or switched by the tool side. With such a configuration, although another mounting tool completing the pairing is present near the tool, it can be prevented that another mounting tool except the mounting tool of the user is authenticated to be operated. Therefore, it is possible to improve a safety.

Figure 4:
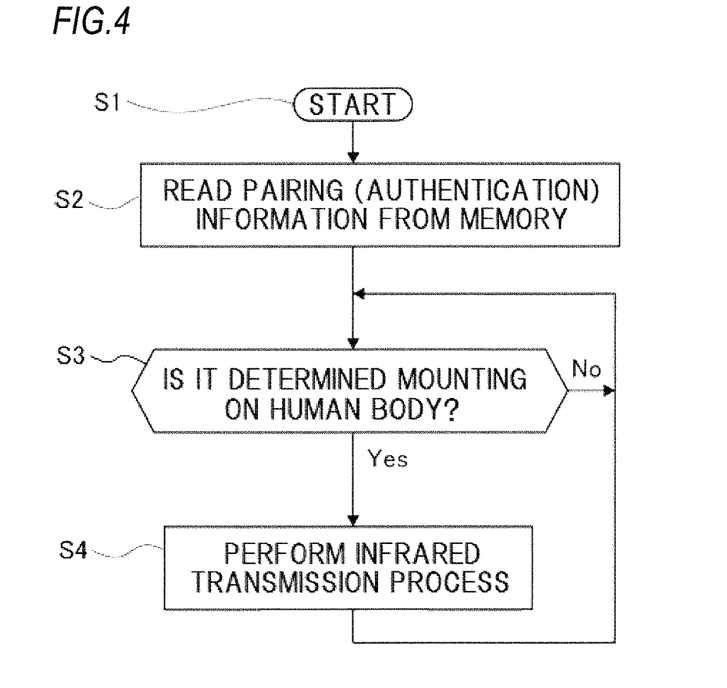
FIG. 4 is a flowchart illustrating an operation of the mounting tool according to this embodiment.

FIG. 4 is a flowchart illustrating the content of a control process of the mounting tool 3 after the pairing with the tool 2 is ended. When a power source (not illustrated) of the mounting tool 3 is turned on, the control process starts (S1), and the controller 12 reads the authentication information W from the memory 11 (S2).

Next, the controller 12 determines, based on the information from the mounting detector 13, whether the mounting tool 3 is mounted on the human body (S3). In a case where it is determined that the mounting tool 3 is mounted on the human body, the authentication information W is transmitted through the infrared transmitter 14 (S4). In a case where it is determined that the mounting tool is not mounted on the human body, the authentication information W is not transmitted, and the determination process is repeated until the mounting tool 3 is mounted on the human body.

Figure 5:
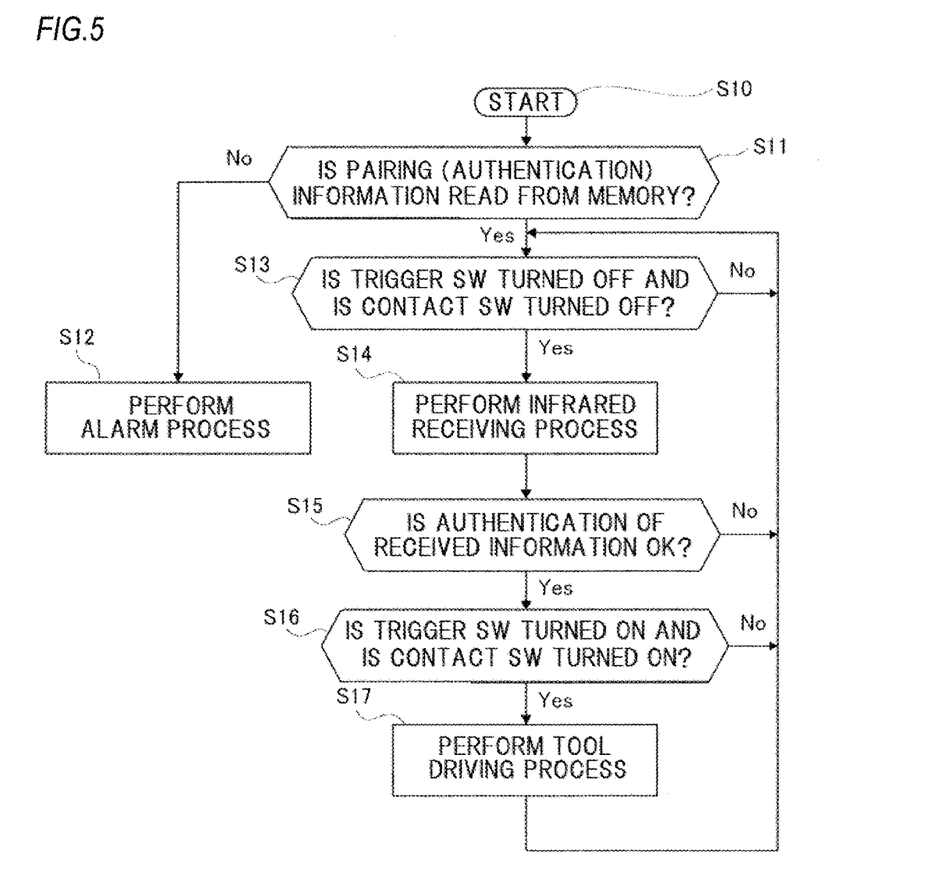
FIG. 5 is a flowchart illustrating an operation of the tool according to this embodiment.

FIG. 5 is a flowchart illustrating the operation process of the tool 2.

When the power source (not illustrated) of the tool 2 is turned on, the control process starts (S10), and the controller 6 reads the authentication information W from the memory 5 (S11). The authentication information W is information based on the unique identification information obtained from the mounting tool 3 through the pair process with the mounting tool 3.

In a case where the authentication information W is not stored in the memory 5, a process is performed that the following operation processes requiring the authentication are stopped, and an alarm that the pairing is necessary is notified to the user (S12). As another embodiment, the tool may be configured as a device which can selectively execute an operation requiring the authentication and the conventional use method not requiring the authentication. In this case, the notification or the like about whether to select the conventional use method is performed.

In a case where the authentication information W is successfully read in the above process (S11), the controller 6 performs a check process about whether the trigger switch 8 is turned off, and the contact switch 7 is turned off (S13). That is, it is checked as an initial state whether the nail driving machine does not contact a driving target member, and a trigger is not operated.

In a case where the trigger switch 8 and the contact switch 7 are turned on at the time of turning on the power source, and the process is continued, the tool may be operated in the next process regardless of the intention of the user, which causes a danger. The check process is intended to prevent the danger. For this reason, first of all, it is checked as an initial state of the tool whether the trigger switch 8 and the contact switch 7 are turned off.

In a case where it is checked in the above process that the trigger switch 8 and the contact switch 7 are turned off, the controller 6 starts a process of receiving the infrared rays through the infrared receiver 10 (S14). In a case where the infrared receiver 10 cannot receive the infrared signal, or the received information is different from the authentication information W of the paired mounting tool in the process, a process routine followed by the above process (S11) is repeated (S15).

In a case where it is determined that the information received in the above process is the authentication information W of the paired mounting tool, next, the controller 6 performs a check process about whether the trigger switch 8 is turned on, and the contact switch 7 is turned on (S16). In a case where the condition is satisfied, the drive part 4 performs the driving process (S17). In a case where the condition of the above process (S16) is not satisfied, a process routine followed by the above process (S13) is repeated.

The above series of processes (S10 to S17) are intended to perform the driving process of the drive part 4 only in a state where the paired tool 2 and mounting tool 3 establish the communication through the infrared rays. That is, in a case where the communication between the tool 2 and the mounting tool 3 is interrupted immediately before the driving process, the driving process is not performed. As long as the same effect can be obtained, another method except the above processing procedure can be used without any problem.

An object of the safety device according to this embodiment is to improve a safety when a predetermined operation of the tool (an original operation of the tool such as a nailing and a screw) is performed through the above-described paired mounting tool and tool. However, regardless of the above object or embodiment, it is possible to control the tool to perform an operation different from the predetermined original operation of the tool according to another object and usage.

For example, in a state where the safety is considered, and the communication between the mounting tool and the tool is established, it is possible to perform a control to start or stop the operation based on the trigger operation, a control to set the tool to a standby (sleep) mode or to return the tool from the standby (sleep) mode based on the communication with the mounting tool, a control to operate the operation mode of the tool based on the communication with the mounting tool, a control to turn on a light and the like of the tool based on the communication with the mounting tool, and the other various controls relating to the operation of the tool.

As well as these various controls are independently performed, it is possible to perform the combination of the various controls. A configuration may be made in which the execution or non-execution of these controls can be selected by the on/off operation of the user.

Based on the establishment of the pairing, the establishment of the pairing may be notified to the user by activating the notification unit which is mounted on the tool or the mounting tool and uses a display or a sound. Based on the establishment of the pairing, the remaining battery power of the tool may be displayed, or an announcement to urge charging may be issued.

When using the tool, a member to be pressed is often pushed with a hand not holding the tool, so that the both hands are full. Thus, it is difficult to change the operation mode or to perform an operation such as lighting and the like in the middle of a work. However, when the technology of the present disclosure is used, the switch is performed without operating a specific portion with a hand, and thus work efficiency can be improved.

Figure 6A:
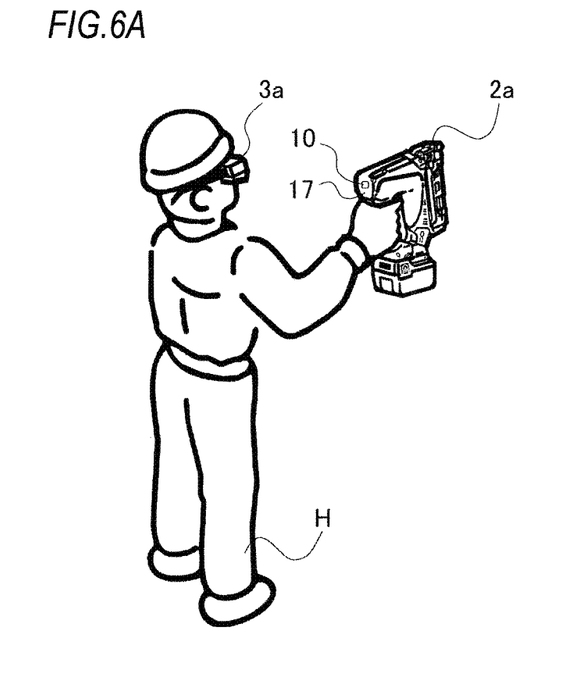
FIG. 6A is an explanatory diagram illustrating an example of a use state of the safety device according to this embodiment.

FIG. 6A illustrates an aspect when the tool (nail driving machine) to which the present disclosure is applied is used. The user H grips a handle grip of the tool 2*a* with any one of the right and left hands, the injection outlet of the tool 2*a* is brought in contact with a predetermined position on the driving target object (not illustrated), and the trigger lever is operated with a finger of the hand griping the handle grip to perform the operation of injecting a nail. The user H wears the mounting tool 3*a* configured in the above-described eyeglasses shape.

FIG. 6A is an explanatory diagram illustrating an example of the use state of the safety device according to this embodiment, and illustrates an example in which a nail is horizontally injected into the driving target object such as a wall or a pillar disposed perpendicularly. In a certain working situation, a nail may be injected in a ceiling direction or a floor direction. However, in the case of assuming the usual use state, the direction of the injection outlet (injection direction) is within a range having a certain angle centered on a sight line direction of the user or a direction to which the face is directed. In the case of assuming the usual use state, the head portion 17 of the housing which is the opposite end to the injection outlet is present in the visible range from the user H. Therefore, in a case where the head portion 17 of the housing is present within the user's field of view, it can be assumed that the tool is in a proper use state.

Figure 6B:
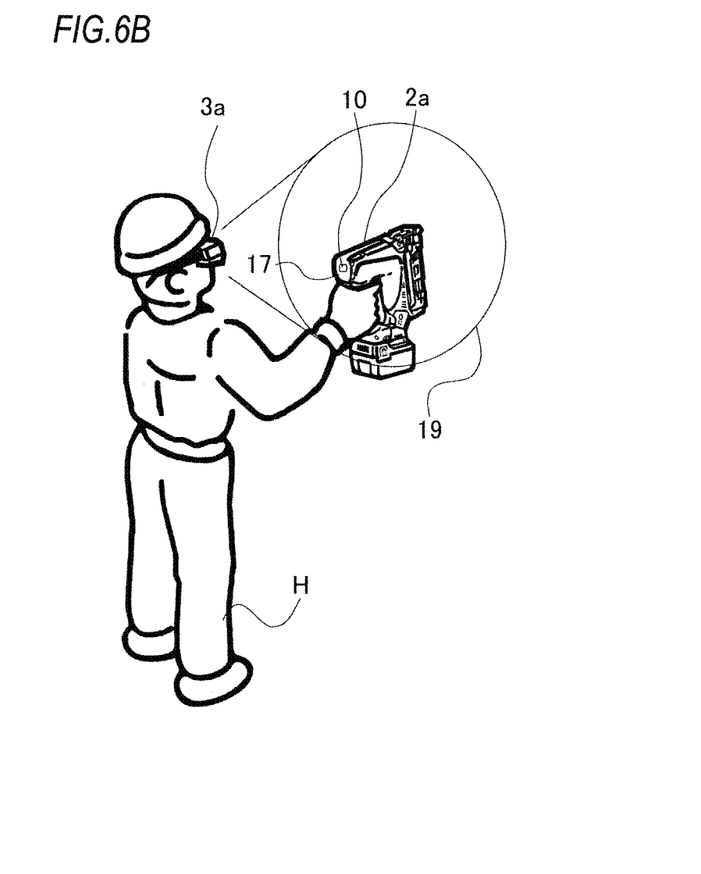
FIG. 6B is an explanatory diagram of an operation state of the safety device according to this embodiment.

FIG. 6B is an explanatory diagram illustrating an operation state of the safety device according to this embodiment, and is an explanatory diagram illustrating an infrared radiation range 19 in which the eyeglasses-shaped mounting tool 3*a* mounted on the user H radiates infrared rays. The infrared radiation range 19 is a conical area which is radially wide in a certain angle centered on the light emitting element.

In this embodiment, assumed that the infrared radiation range 19 is a range of the user H's field of view, in a case where the head portion 17 of the housing is present in the infrared radiation range 19, it is assumed that the user H visually recognize the object, and the tool is permitted to be operated. That is, when an infrared receiving part 18 provided in the head portion 17 of the housing receives the infrared rays radiated from the mounting tool 3*a*, the tool is permitted to be operated.

In some cases, the direction of the injection outlet is inclined 90 degrees from the sight line (or a direction of the face). However, since the cases mean a state where the tool is viewed directly from the side, the cases belong to a considerably special use method although there is the case of performing the use method practically. Therefore, in a case where the tool is permitted to be used in such a state, the safety mechanism using the pairing between the mounting tool and the tool may be released to use the conventional use method.

Figure 6C:
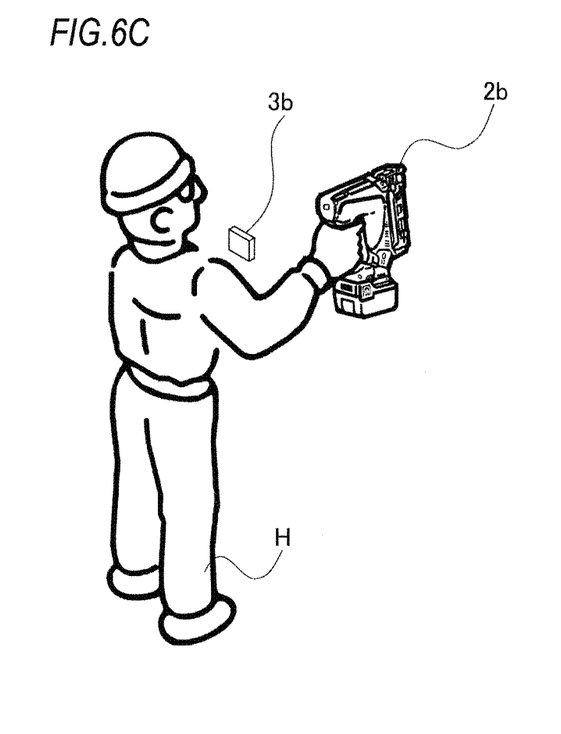
FIG. 6C is an explanatory diagram illustrating an example of a use state of a safety device according to another embodiment.

FIG. 6C is an explanatory diagram illustrating an example of a use state of a safety device according to another embodiment, and illustrates a case where the mounting tool 3*b* mounted on the user H is formed as a badge attached on a breast of a shirt. When the user H wears the mounting tool 3*b* on the breast of the shirt and the like, the mounting tool 3*b* is directed to front direction of a body (breast). In this manner, the infrared signal is radiated from the badge in a certain range of the front direction of the body. In a case where there is the paired tool 2*b* receiving the infrared signal in the radiation range, it is assumed that the user H performs an operation while the user views the tool 2*b*, and thus the operation is allowed to be performed. That is, a control such as a permission or a limitation of an operation is performed on the condition that it is detected that the tool and the mounting tool face each other within a certain range.

An example of such a mounting tool mounted on the body is various, and in addition to the above-described eyeglasses or badge, any shape such a necklace, a button, and a shirt can be adopted to be mounted on the body.

In the attaching position of the mounting tool, the mounting tool is preferably configured to be mounted on the head and the like positioned above a neck of the body so as to be interlinked to a direction of the face, which is most suitable. From such a viewpoint, the mounting tool can be configured to have a shape of the above-described eyeglasses mounted on the face, and shapes of a helmet, a hat, a headphone, a headset, and a headband mounted on the head. Various shapes such as an earplug, an earring, a pierce, and an earphone mounted on an ear, a mask, a nasal plug, and contact lens may be adopted.

In the above-described embodiment, the description has been given about an example in which a communication part is mounted on a tool body. However, the communication part may be provided in a peripheral device adjunct to the tool body. An example of such a peripheral device includes an air hose, an air hose adapter, a battery, and a tool (battery) adapter. The communication part may be directly mounted on the tool or may be not mounted on the tool, and any shape can be adopted. The communication part may be configured to be provided in the air hose, and to limit the operation by controlling a valve. The communication part may be configured to be provided in a cut-off switch provided in a power cord, and to control the operation of the tool.

Additionally, the communication part may be provided in a glove, a watch, a band, a ring, and a sleeve of clothes which can be mounted near a hand holding the tool. In a case where the tool is a stationary device, the communication part may be provided in an operator panel thereof.

Additionally, in a method of communicating between the mounting tool and the communication part on the tool side, in addition to the above-described method in which the infrared rays are used as a communication medium (to be described later), a method of using light, radio waves, and sound waves (ultrasound wave) as a wireless signal except the infrared rays also may be adopted without any problem.

Each communication medium is different in a directional characteristic, a size of output suitable for communication, and characteristic to be considered during communication, and thus it is necessary to give proper consideration to the mounting tool and the communication part on the tool side according to each communication medium. A limitation may be performed in such a manner that the directional characteristic, signal strength, and the like are set to be adjustable, or a corresponding model is set by selecting a frequency.

For example, in a case where radio waves are used as the communication medium, the directional characteristic can be adjusted by using a horn antenna having a high directional characteristic, a rod antenna or a chip antenna having a low directional characteristic, and the like as a transmitter or a receiver.

In a case where the infrared rays are used as the communication medium, the directional characteristic can be adjusted by providing lens of the transmitter and the receiver and a member (cylindrical one and the like) for limiting a range of emitting and condensing. The directional characteristic can be adjusted also by changing the transmission strength and frequency together with the radio waves and the infrared rays.

The entire above-described example has a configuration that the mounting tool sends the infrared lays and the other signals including recognition information, and the tool receives these signals to control whether to operate. However, inversely with the aspect, a configuration may be adopted in which the communication is performed by providing a tool with the transmission unit which sends the infrared lays and the other signals including recognition information, and providing a mounting tool attached to the user's body with the reception unit which receives the infrared lays and the other signals, and whether to operate is controlled based on the communication result thereof.

[Another Embodiment]

The tool such as the nail driving machine using air pressure or electrical power as an operation source is easy to use due to light weight which enables the tool to be operated with one hand, regardless of high output. For this reason, it is easy to carry during the work. When the tool contacts a building material and the like except the driving target object in the middle of carrying, the trigger lever is in a pulled state at that time, and there is a possibility that the tool is operated erroneously. However, in a case where the handled tool is within the user's field of view, such an erroneous operation hardly occurs.

From such a viewpoint, the above-described shape of tool is configured to be operable when a state where the tool is present within a certain range in which the face or the front surface of the body is directed is assumed by the tool receiving the infrared signal sent by the mounting tool mounted on the user.

The essence of the above-described invention is to set a state about whether the user views the tool as a condition of the tool operation. Therefore, when it is possible to directly perform the determination on whether the user views the tool or not, such a unit may be used without any problem. For example, an image sensor such as CCD and CMOS is mounted in the tool, and the sight line of the user is detected from information of the captured image. In a case where it is determined that the user gazes a tool direction or a processed portion, the tool is permitted to be operated, which is a configuration having no problem.

The head portion 17 of the above-described tool 2 may be provided with an imaging unit instead of the infrared receiver 10 or in addition to the infrared receiver 10. The imaging unit captures an image or a video by imaging the opposite direction to the nail injection direction from the head portion 17. The control unit (controller 6) of the tool 2 analyzes the captured image or video to detect the presence of the mounting tool, the face or the sight line of the user, and the like. When the tool 2 is configured as above, a control such as a permission or a limitation of the operation of the tool 2 can be performed on the condition that the imaging unit detects the face or the sight line of the user operating the mounting tool or the tool, and the like.

As another embodiment of the present disclosure, the imaging unit may be provided in the above-described mounting tool 3 worn by the user. In this case, the imaging unit is disposed such that the mounting position of the mounting tool 3 is properly set to capture an image or a video according to a facial direction of the user or a posture of an upper body. On the other hand, a mark and another identification mark which are distinguishable by the analysis of the captured image or video are mounted in a position viewed from the head portion 17 of the tool 2 or the imaging unit.

With such a configuration, the control unit (controller 12) of the mounting tool 3 can alternatively determine whether the user faces a direction of the tool 2 by determining whether the above-described identification mark is present in the image or video captured by the imaging unit. By transmitting the determination result to the tool 2, the control unit (controller 6) of the tool 2 can perform a control such as a permission or a limitation of the operation of the tool 2.

Recently, there have been developed various goggle-shaped (eyeglasses) wearable terminals mounted with a computer function. The wearable terminal includes an image sensor such as a small-sized CCD or CMOS, includes a CPU function which performs a process on various kinds of information including the image obtained from the image sensor, and is mounted with a unit for displaying the image on the wearer's field of view according to the usage. When using the wearable terminal, a direction of the sight line can be detected by detecting the motion of eyes of the wearer, and information on what the wearer views can be obtained in real time by combination with the video captured by the image sensor. When using the wearable terminal having such a configuration, in a case where the wearer views the tool mounted with the identification mark registered in advance and the like, the permission signal is transmitted to control the operation that permits (releasing of operation inhibition) the operation of the tool receiving the permission signal.

In above-described embodiments, the opposing relation between the tool and the mounting tool is determined by using a signal transmission unit or an image recognition unit provided in one of the tool and the mounting tool, and the limitation of the operation is performed when the relation is not in an opposing state or a state equivalent thereto. As for that, a detector provided externally unlike the tool and the mounting tool may determine whether the tool and the mounting tool are in the opposing state to perform a limitation of the operation based on the determination. For example, a camera as the externally provided detector may image a state of the tool and the mounting tool, the captured video may be subject to an image process (and image recognition), and a limitation of the operation may be performed. In a case where the safety device is configured as above, it is desirable to perform the communication between the tool and the detector, and thus it is not necessary to perform the communication between the tool and the mounting tool. Accordingly, it is not necessary that a mounting portion includes a communication function, and thus a simple mounting portion can be used so that an influence on a work can be reduced.

In the above-described embodiment, the description has been given about a case where individual identification information is set to the mounting tool 3. However, instead of the embodiment or in addition to the embodiment, the individual identification information may be set to the tool 2. In a case where the individual identification information may be set only to the tool 2, the mounting tool 3 performs the authentication process on the tool 2, the result is transmitted to the tool 2, and a control such as a permission or a limitation of the operation of the tool 2 can be performed. In a case where the individual identification information may be set to both the tool 2 and the mounting tool 3, both controls authenticate the identification information received from the other, and a control such as a permission or a limitation of the operation of the tool 2 can be performed. In this case, without any problem, a control such as a permission or a limitation of the operation of the tool 2 can be performed when it is set as a determination condition whether the combination of the identification information set in both the tool 2 and the mounting tool 3 matches with a preset one.

The various above-described embodiments may be practiced with various combinations thereof. The invention is not limited to the above-described embodiments, and various modifications can be made without departing from the scope of claims.

The present disclosure can be used to improve a safety of various tools such as a nail driving machine, a circular saw, and a grinder.

What is claimed is:

1. A safety device comprising:
a tool which performs a predetermined operation through an operation of an actuator;
a mounting tool worn by a user operating the tool;
a transmission unit which is provided in one of the tool or the mounting tool, and transmits a wireless signal in which a transmission direction is set to have high directional characteristic with respect to a certain direction by the wireless signal being limited to the certain direction;
a reception unit which is provided in the other of the tool or the mounting tool, and receives the wireless signal transmitted by the transmission unit; and
a controller which controls the tool on a condition that the reception unit recognizes the wireless signal, wherein
the tool and the mounting tool are configured to be capable of setting individual identification information, and
the controller controls the tool on a condition that it is recognized that a combination of the tool and the mounting tool is a preset combination.

2. A safety device comprising:
a tool which performs a predetermined operation through an operation of an actuator;
a mounting tool worn by a user operating the tool;
a reception unit which is provided in one of the tool or the mounting tool, and receives a wireless signal in which a receiving direction is set to have high directional characteristic with respect to a certain direction by the receiving direction being limited to the certain direction;
a transmission unit which is provided in the other of the tool or the mounting tool, and transmits the wireless signal which is receivable by the reception unit; and
a controller which controls the tool on a condition that the reception unit recognizes the wireless signal, wherein
the tool and the mounting tool are configured to be capable of setting individual identification information, and
the controller controls the tool on a condition that it is recognized that a combination of the tool and the mounting tool is a preset combination.

3. The safety device according to claim 1, wherein the wireless signal is a signal using radio waves or sound waves.

4. The safety device according to claim 2, wherein the wireless signal is a signal using radio waves or sound waves.

5. The safety device according to claim 1, wherein the mounting tool is mountable on a face or a head of the user operating the tool.

6. The safety device according to claim 2, wherein the mounting tool is mountable on a face or a head of the user operating the tool.

7. The safety device according to claim 1, wherein the mounting tool is provided with a mounting detector which detects a state of the tool being mounted on the user operating the tool.

8. The safety device according to claim 2, wherein the mounting tool is provided with a mounting detector which detects a state of the tool being mounted on the user operating the tool.

9. A safety device according to claim 1, wherein the controller controls the tool on a condition that it is detected that the tool and the mounting tool are opposed to each other within a certain range.

10. A safety device according to claim 2, wherein
the controller controls the tool on a condition that it is detected that the tool and the mounting tool are opposed to each other within a certain range.

11. A tool which performs a predetermined operation through an operation of an actuator, the tool comprising:
a communication unit which performs communication with a mounting tool worn by a user operating the tool through a wireless signal, the wireless signal being limited to a certain transmission direction or receiving direction; and
a controller which is capable of executing an operation different from the predetermined operation on a condition that the wireless signal is recognized between the tool and the mounting tool, or it is detected that the tool and the mounting tool are opposed to each other within a certain range, wherein
the tool and the mounting tool are configured to be capable of setting individual identification information, and
the controller controls the tool on a condition that it is recognized that a combination of the tool and the mounting tool is a preset combination.

12. The safety device according to claim 1, wherein the certain direction is directed toward a face of the user wearing the mounting tool or a front surface of a body of the user.

13. The safety device according to claim 2, wherein the certain direction is directed toward a face of the user wearing the mounting tool or a front surface of a body of the user.

14. The safety device according to claim 11, wherein the wireless signal is set to have high directional characteristic with respect to a direction which is directed toward a face of the user wearing the mounting tool or a front surface of a body of the user.

15. The safety device according to claim 1, wherein the wireless signal is an infrared signal, and a light emitting element or a light receiving element of the infrared signal is contained in an opening provided in an end portion of the tool or the mounting tool.

16. The safety device according to claim 2, wherein the wireless signal is an infrared signal, and a light emitting element or a light receiving element of the infrared signal is contained in an opening provided in an end portion of the tool or the mounting tool.

17. The safety device according to claim 11, wherein the wireless signal is an infrared signal, and a light emitting element or a light receiving element of the infrared signal is contained in an opening provided in an end portion of the tool or the mounting tool.

* * * * *